(12) United States Patent
Kaiser et al.

(10) Patent No.: US 7,915,364 B2
(45) Date of Patent: Mar. 29, 2011

(54) METHOD FOR PRODUCING VINYL CHLORIDE-VINYL ACETATE COPOLYMERS IN THE FORM OF THEIR SOLID RESINS

(75) Inventors: Stephan Kaiser, Altoetting (DE); Claudia Strohmeier, Geratskirchen (DE); Franz Zenk, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 501 days.

(21) Appl. No.: 12/065,034

(22) PCT Filed: Aug. 9, 2006

(86) PCT No.: PCT/EP2006/065187
§ 371 (c)(1),
(2), (4) Date: Feb. 27, 2008

(87) PCT Pub. No.: WO2007/025847
PCT Pub. Date: Mar. 8, 2007

(65) Prior Publication Data
US 2008/0221292 A1    Sep. 11, 2008

(30) Foreign Application Priority Data
Sep. 1, 2005  (DE) .......................... 10 2005 041 593

(51) Int. Cl.
*C08F 114/06*    (2006.01)
*C08F 218/02*    (2006.01)
*C08F 220/04*    (2006.01)
*C08G 65/26*    (2006.01)

(52) U.S. Cl. .................. 526/317.1; 526/330; 526/344.2; 528/393

(58) Field of Classification Search .............. 526/317.1, 526/330, 344.2; 528/393
See application file for complete search history.

(56) References Cited

U.S. PATENT DOCUMENTS

| 3,583,959 | A | 6/1971 | Shen et al. |
| 4,195,168 | A | 3/1980 | Bobbin |

FOREIGN PATENT DOCUMENTS

| DE | 1105177 | | 9/1958 |
| DE | 1770901 | | 2/1972 |
| DE | 2206593 | | 8/1973 |
| DE | 2409800 | | 9/1975 |
| DE | 135620 | | 5/1979 |
| GB | 899593 | A * | 6/1962 |
| GB | 1113350 | A | 5/1968 |
| GB | 1592012 | A | 7/1981 |

OTHER PUBLICATIONS

English Patbase Abstract corresponding to DE1105177, Apr. 20, 1961.
English Patbase Abstract corresponding to DE2409800, Mar. 1, 1974.
English Patbase Abstract corresponding to DE1770901, Jul. 17, 1968.
English Patbase Abstract corresponding to DE2206593, Aug. 16, 1973.
English Patbase Abstract corresponding to DD135620, May 16, 1979.

* cited by examiner

*Primary Examiner* — Michael M Bernshteyn
(74) *Attorney, Agent, or Firm* — Brooks Kushman P.C.

(57) ABSTRACT

The invention provides a process for preparing vinyl chloride-vinyl acetate copolymers in the form of their solid resins by means of free-radically initiated suspension polymerization in aqueous medium of 70% to 90% by weight of vinyl chloride, 10% to 30% by weight of vinyl acetate and, if desired, further comonomers copolymerizable therewith, characterized in that 0.1% to 5% by weight of a vinyl acetate-vinyl chloride copolymer soluble in ethyl acetate is introduced as an initial charge, the amounts in % by weight being based in each case on the total weight of the comonomers.

20 Claims, No Drawings

METHOD FOR PRODUCING VINYL CHLORIDE-VINYL ACETATE COPOLYMERS IN THE FORM OF THEIR SOLID RESINS

CROSS-REFERENCE TO RELATED APPLICATION

This application is the U.S. national phase of PCT Appln. No. PCT/EP2006/065187 filed Aug. 9, 2006, which claims priority to German application 10 2005 041 593.8 filed Sep. 1, 2005.

BACKGROUND OF THE INVENTION

1. Field of the Invention

The invention relates to a process for preparing vinyl chloride-vinyl acetate copolymers in the form of their solid resins by the suspension polymerization process in aqueous medium, and to the use of the solid resins thus obtainable as binders in coating materials.

2. Description of the Related Art

It is known that vinyl chloride-vinyl acetate copolymers with a low fraction of carboxyl-functional monomer units are suitable binders for coating materials. When copolymers of this kind are prepared by the solution polymerization process the products obtained feature high purity and ready solubility in coating-material solvents such as aliphatic esters or ketones. Drawbacks of the solution polymerization process are, however, the low conversion and the large quantities of solvents which arise when the copolymer is isolated by precipitation and which have to be recovered, at cost and inconvenience.

At an early stage, therefore, there were attempts to avoid these drawbacks by polymerization in aqueous medium. A problem with this, however, is that the vinyl chloride-vinyl acetate copolymers thus obtainable are of relatively poor solubility in organic solvents and lead to hazing of the coating-material solution.

DE-B 1105177 describes a process in which vinyl chloride and vinyl acetate are polymerized in aqueous suspension, the complete vinyl acetate fraction being introduced as an initial charge and the vinyl chloride fraction being introduced as an initial charge in an amount such that there is 40 to 60% by weight of vinyl chloride in the monomer mixture. DE-A 2409800 discloses a process for polymerizing vinyl chloride and vinyl acetate in aqueous suspension where all of the constituents of the polymerization batch, but only 50% to 80% by weight of the vinyl chloride employed are introduced as an initial charge, and the remaining VC fraction is metered in continuously after the start of the polymerization. A drawback with this metering process is that the solubility in aliphatic esters is inadequate, implying a hazy solution and numerous undissolved flakes.

In the process of DE-A 1770901 the suspension polymerization is carried out in the presence of a water-insoluble solvent which is, however, a good solvent for the monomers. In the process of DE-A 2206593 the suspension polymerization of vinyl chloride and vinyl acetate is carried out in the presence of cellulose ether as protective colloid and in the presence of organic solvent. A drawback with these processes is the solvent fraction, which must be disposed of or recycled, at cost and inconvenience.

DD Patent 135620 polymerizes vinyl chloride and vinyl acetate in the presence of comonomers containing carboxyl groups or hydroxyl groups in aqueous suspension, and introduces polyvinyl chloride or polyvinyl acetate as powders or in the form of an aqueous dispersion as an initial charge. The products thus obtained exhibit hazing in aliphatic esters, owing to the insoluble polymer fraction.

SUMMARY OF THE INVENTION

An object of the invention is therefore to provide a polymerization process with which, in aqueous suspension, vinyl chloride-vinyl acetate copolymers are accessible in the form of their solid resins, these copolymers having the solution properties for which film-forming resins prepared by the solution polymerization process are prized. These and, other objects are achieved by an aqueous, free radical-initiated suspension polymerization of vinyl acetate and vinyl chloride wherein a small fraction of ethyl acetate-soluble vinyl acetate-vinyl chloride copolymer is introduced into the polymerization reactor as an initial charge.

DETAILED DESCRIPTION OF THE PREFERRED EMBODIMENTS

The invention provides a process for preparing vinyl chloride-vinyl acetate copolymers in the form of their solid resins by means of free-radically initiated suspension polymerization in aqueous medium of 70% to 90% by weight of vinyl chloride, 10% to 30% by weight of vinyl acetate and, if desired, further comonomers copolymerizable therewith, characterized in that 0.1% to 5% by weight of a vinyl acetate-vinyl chloride copolymer soluble in ethyl acetate is introduced as an initial charge, the amounts in % by weight being based in each case on the total weight of the comonomers.

Preferably 10% to 20% by weight of vinyl acetate and 80% to 90% by weight of vinyl chloride are copolymerized.

In one preferred embodiment additionally 0.1% to 10% by weight of ethylenically unsaturated monocarboxylic or dicarboxylic acids are copolymerized, the amounts in % by weight for the comonomers being based in each case on the total weight of the comonomers and totaling 100% by weight. Examples of ethylenically unsaturated monocarboxylic and dicarboxylic acids are acrylic acid, methacrylic acid, fumaric acid, itaconic acid, crotonic acid and maleic acid, which can also be copolymerized in the form of maleic anhydride.

If desired it is also possible to copolymerize epoxide-containing monomers, examples being methylglycidyl methacrylate, methylglycidyl acrylate, allyl glycidyl ether, allylphenol glycidyl ether and glycidyl methacrylate. Preference is given to glycidyl methacrylate (GMA). If epoxide-containing monomers are copolymerized the amount is generally 0.01% to 10% by weight, based on the total weight of the comonomers.

By suitable vinyl acetate-vinyl chloride copolymers soluble in ethyl acetate are meant those which can be dissolved completely, in other words with optical clarity, as a 20% strength by weight solution at room temperature. The solubility in ethyl acetate ought therefore, under standard conditions (23/50 in accordance with DIN 50014), to be $\geq 20\%$ by weight. The copolymers contain generally 15% to 50% by weight of vinyl acetate and 50% to 85% by weight of vinyl chloride.

It is preferred to introduce 0.2% to 2% by weight, more preferably 0.5% to 1% by weight, of vinyl acetate-vinyl chloride copolymers, soluble in ethyl acetate, as an initial charge, based in each case on the total weight of the comonomers. The vinyl acetate-vinyl chloride copolymers soluble in ethyl acetate can be prepared by typical polymerization processes, preferably by the emulsion or solution polymerization process. In general the vinyl acetate fraction is 15% to 80% by weight, based on the total weight of the vinyl acetate-vinyl chloride copolymer.

The polymerization temperature in the process of the invention is generally 20° C. to 80° C. The polymerization can be initiated using the monomer-soluble initiators common for suspension polymerization. Examples of monomer-soluble initiators are dicetyl peroxydicarbonate, dicyclohexyl peroxydicarbonate, dibenzoyl peroxide, dilauroyl peroxide and tert-butyl peroxypivalate. The stated initiators are used generally in an amount of 0.01% to 1.0% by weight, preferably 0.1% to 0.5% by weight, based in each case on the total weight of the comonomers. The suspension polymerization is carried out in water in the presence of protective colloids. Examples of suitable protective colloids include partly and fully hydrolysed polyvinyl alcohols, celluloses and their carboxymethyl, methyl, hydroxyethyl and/or hydroxypropyl derivatives. In general from 0.05% to 5% by weight of protective colloid is used, based on the total weight of the comonomers.

In order to improve the thermal stability of the solid resins it is possible if desired, during or after the polymerization, to add 0.001% to 0.1% by weight, preferably 0.005% to 0.05% by weight, of ascorbic acid and/or isoascorbic acid, based in each case on the total weight of the comonomers. Preference is given to using ascorbic acid. The addition is made preferably after the conclusion of the monomer feed and also before, during or after the removal of residual monomer. The most preferred embodiment is that in which, in addition to the ascorbic acid and/or isoascorbic acid, citric acid as well is added. The amount of citric acid is 0.001% to 0.1% by weight, preferably 0.005% to 0.05% by weight, based in each case on the total weight of the comonomers.

In order to control the molecular weight it is possible to use regulator substances during the polymerization. If regulators are used they are typically employed in amounts between 0.02% to 10.0% by weight, based on the monomers to be polymerized, and are typically metered in separately or else as a premix with reaction components. Examples of such substances are halogenated alkanes and halogenated alkenes such as carbon tetrachloride, chloroform, methyl chloride, trichloroethylene and also aldehydes such as acetaldehyde, propionaldehyde, butyraldehyde and isobutyraldehyde.

The monomers can be metered in their entirety or else included in fractions in the initial charge, with the remainder metered in after the polymerization has been initiated. The metered feeds may be carried out separately (in space and in time). After the conclusion of the polymerization it is possible to carry out postpolymerization for the purpose of removing residual monomers, employing known methods; for example, by postpolymerization initiated with redox catalyst. Volatile residual monomers can also be removed by distillation, preferably under reduced pressure, and, if desired, with inert entraining gases such as air, nitrogen or steam being passed through or over the batch.

The vinyl chloride-vinyl acetate copolymer can be isolated in the form of the solid resin from the aqueous dispersion by means of typical processes, such as by precipitation, filtration and subsequent drying, or by means of decanting and subsequent drying, for example. Drying can take place in a way which is known to the skilled person: for example, in a drum dryer, in a flow tube, in a fluidized bed or in a cyclone dryer.

The vinyl chloride-vinyl acetate copolymers are suitable as binders for coating materials, particularly in heat-sealing lacquers, such as for coating aluminium, for example. They are distinguished by their outstanding solubility in all typical coating-material solvents. It is notable that the products not only dissolve in the ketones frequently employed as solvents but are also readily soluble, without heating, even at room temperature (23° C.), in solvents critical for vinyl chloride-vinyl acetate copolymers, such as aliphatic esters.

The examples below serve to illustrate the invention.

Inventive Example 1

An autoclave with stirrer mechanism was charged with 50 kg of fully demineralized water, 60 g of dilauroyl peroxide, 0.6 kg of maleic acid and 2 kg of a 3% strength by weight aqueous MHPC solution (Metolose 90 SH 100 from Shin Etsu) together with 150 g of a pulverulent copolymer prepared by the emulsion polymerization process (84% by weight vinyl chloride, 15% by weight vinyl acetate, 1% by weight itaconic acid). The autoclave was then closed and vacuum was applied until the pressure was 0.05 bar. The autoclave was further charged with 1.5 kg of vinyl acetate and 4.5 kg of vinyl chloride and heated to 70° C. with stirring, at which point the polymerization began. After the pressure had dropped to 7 bar, a mixture of 3.5 kg of vinyl acetate and 20.5 kg of vinyl chloride was pumped continuously into the autoclave under constant pressure. At the end of the comonomer feed the batch was let down to atmospheric pressure, then demonomerized and neutralized by addition of 20 g of 10% by weight NaOH. The copolymer obtained was filtered, washed and dried. A 20% strength by weight solution of this copolymer in ethyl acetate was prepared at room temperature. After 20 minutes of stirring, a clear solution was obtained.

Comparative Example 2

The procedure of Inventive Example 1 was repeated, with the difference that no copolymer was included in the initial charge.

A 20% strength by weight solution of this copolymer was prepared in ethyl acetate at room temperature. After 20-minute stirring there were still gelatinous, jellylike constituents present (incomplete solution, partial swelling of the polymer). After heating at 50° C. and further stirring for 20 minutes a clear solution was obtained.

Comparative Example 3

A commercial copolymer prepared by the solution process with a composition of 84% by weight vinyl chloride, 15% by weight vinyl acetate and 1% by weight maleic acid (UCAR® VMCH) was dissolved in ethyl acetate at room temperature. 10 g of the polymer in 40 g of ethyl acetate were added and the system was stirred at room temperature for 20 minutes. A clear solution was obtained.

Inventive Example 4

An autoclave with stirrer mechanism was charged with 50 kg of fully demineralized water, 60 g of dilauroyl peroxide, 0.6 kg of maleic acid and 2 kg of a 3% strength by weight aqueous MHPC solution (Metolose 90 SH 100 from Shin Etsu) together with 150 g of a pulverulent copolymer prepared by the emulsion polymerization process (84% by weight vinyl chloride, 15% by weight vinyl acetate, 1% by weight itaconic acid). The autoclave was then closed and vacuum was applied until the pressure was 0.05 bar. The autoclave was further charged with 1.5 kg of vinyl acetate and 4.5 kg of vinyl chloride and heated to 70° C. with stirring, at which point the polymerization began. After the pressure had dropped to 7 bar, a mixture of 3.5 kg of vinyl acetate, 20.5 kg of vinyl chloride and 0.12 kg of glycidyl methacrylate was pumped continuously into the autoclave under constant pressure. At the end of the comonomer feed 0.015 kg of ascorbic acid and 0.002 kg of citric acid were added to the batch, in each case as 10% strength aqueous solutions. Immediately after this addition the batch was let down to atmospheric pressure, then demonomerized and neutralized by addition of 20 g of 10% by weight NaOH. The copolymer obtained was filtered, washed and dried. A 20% strength by weight solution of this copolymer in ethyl acetate was prepared at room temperature. After 20 minutes of stirring, a clear solution was obtained. Moreover, this solution remained completely colourless even after a storage period of one week at 60° C.

Inventive Example 5

The procedure of Inventive Example 1 was repeated with the difference that the copolymer used was a copolymer prepared by the solution process with a composition of 84% by weight vinyl chloride, 15% by weight vinyl acetate and 1% by weight maleic acid. A 20% strength by weight solution of the resulting copolymer in ethyl acetate was prepared at room temperature. After 20 minutes of stirring, a clear solution was obtained.

Inventive Example 6

The procedure of Inventive Example 1 was repeated with the difference that the copolymer used was a copolymer prepared by the suspension process with a composition of 69% by weight vinyl chloride, 30% by weight vinyl acetate and 1% by weight fumaric acid. A 20% strength by weight solution of the resulting copolymer in ethyl acetate was prepared at room temperature. After 20 minutes of stirring, a clear solution was obtained.

Comparative Example 7

The procedure of Inventive Example 1 was repeated with the difference that the copolymer used was a copolymer prepared by the suspension process, with a composition of 89% by weight vinyl chloride and 11% by weight vinyl acetate, which is not soluble in ethyl acetate. A 20% strength by weight solution of the resulting copolymer in ethyl acetate was prepared at room temperature. After 20 minutes of stirring, there were still gelatinous, jellylike constituents present (incomplete dissolution, partial swelling of the polymer), which did not dissolve fully even on heating at 50° C.

Comparative Example 8

The procedure of Inventive Example 1 was repeated with the difference that instead of a copolymer equal quantities of a vinyl acetate homopolymer (VINNAPAS® UW 10) were introduced as an initial charge. This homopolymer gives clear solutions in ethyl acetate.

A 20% strength by weight solution of the resulting copolymer in ethyl acetate was prepared at room temperature. After 20 minutes of stirring, a hazy solution was obtained.

A comparison of Inventive Example 1 with Comparative Example 2 shows the advantage of the process of the invention (no heating required). Comparative Example 3 (dissolution experiment on a commercial film-forming resin prepared by the solution process) shows that the products of the process of the invention are comparable with solution polymers in terms of their solubility. Inventive Example 4 shows the improved solubility for thermally stable film-forming resins as well. Inventive Examples 5 and 6 show that the preparation process for the copolymer introduced as an initial charge can be arbitrary. Comparative Examples 7 and 8 show that the composition and the solubility in ethyl acetate are essential for the copolymer introduced as an initial charge.

The invention claimed is:

1. A process for preparing vinyl chloride-vinyl acetate copolymers in the form of their solid resins by means of free-radically initiated suspension polymerization in aqueous medium, comprising polymerizing in a polymerization reactor 70% to 90% by weight of vinyl chloride, 10% to 30% by weight of vinyl acetate, optionally further comonomers copolymerizable therewith, the amounts in % by weight being based on the total weight of the comonomers being polymerized, wherein 0.1% to 5% based on the weight of the comonomers being polymerized of a vinyl acetate-vinyl chloride copolymer soluble in ethyl acetate is introduced into the polymerization reactor as an initial charge.

2. The process of claim 1, wherein 10% to 20% by weight of vinyl acetate and 80% to 90% by weight of vinyl chloride are copolymerized.

3. The process of claim 1, wherein additionally 0.1% to 10% by weight of ethylenically unsaturated monocarboxylic or dicarboxylic acids are copolymerized.

4. The process of claim 1, wherein additionally epoxide-containing monomers are copolymerized.

5. The process of claim 1, wherein during or after the polymerization, 0.001% to 0.1% by weight of ascorbic acid and/or isoascorbic acid, based on the total weight of the comonomers, is added, and optionally, in addition to the ascorbic acid and/or isoascorbic acid, citric acid is added in an amount of 0.001% to 0.1% by weight, based on the total weight of the comonomers.

6. The process of claim 1, wherein a vinyl acetate-vinyl chloride copolymer soluble in ethyl acetate comprising 15 to 85 weight percent vinyl acetate moieties is employed.

7. The process of claim 2, wherein additionally 0.1% to 10% by weight of ethylenically unsaturated monocarboxylic or dicarboxylic acids are copolymerized.

8. The process of claim 2, wherein additionally epoxide-containing monomers are copolymerized.

9. The process of claim 3, wherein additionally epoxide-containing monomers are copolymerized.

10. The process of claim 2, wherein during or after the polymerization, 0.001% to 0.1% by weight of ascorbic acid and/or isoascorbic acid, based on the total weight of the comonomers, is added, and optionally, in addition to the ascorbic acid and/or isoascorbic acid, citric acid is added in an amount of 0.001% to 0.1% by weight, based on the total weight of the comonomers.

11. The process of claim 3, wherein during or after the polymerization, 0.001% to 0.1% by weight of ascorbic acid and/or isoascorbic acid, based on the total weight of the comonomers, is added, and optionally, in addition to the ascorbic acid and/or isoascorbic acid, citric acid is added in an amount of 0.001% to 0.1% by weight, based on the total weight of the comonomers.

12. The process of claim 4, wherein during or after the polymerization, 0.001% to 0.1% by weight of ascorbic acid and/or isoascorbic acid, based on the total weight of the comonomers, is added, and optionally, in addition to the ascorbic acid and/or isoascorbic acid, citric acid is added in an amount of 0.001% to 0.1% by weight, based on the total weight of the comonomers.

13. The process of claim 2, wherein a vinyl acetate-vinyl chloride copolymer soluble in ethyl acetate comprising 15 to 85 weight percent vinyl acetate moieties is employed.

14. The process of claim 3, wherein a vinyl acetate-vinyl chloride copolymer soluble in ethyl acetate comprising 15 to 85 weight percent vinyl acetate moieties is employed.

15. The process of claim 4, wherein a vinyl acetate-vinyl chloride copolymer soluble in ethyl acetate comprising 15 to 85 weight percent vinyl acetate moieties is employed.

16. The process of claim 5, wherein a vinyl acetate-vinyl chloride copolymer soluble in ethyl acetate comprising 15 to 85 weight percent vinyl acetate moieties is employed.

17. A vinyl acetate and vinyl chloride copolymer in the form of a spherical particle powder, prepared by the process of claim 1, and the further process step of isolating polymer particles formed in the suspension polymerization and drying, the particles soluble in ethyl acetate at 20 weight percent solids to form a clear solution.

18. A vinyl acetate and vinyl chloride copolymer in the form of a spherical particle powder, prepared by the process of claim 2, and the further process step of isolating polymer particles formed in the suspension polymerization and drying, the particles soluble in ethyl acetate at 20 weight percent solids to form a clear solution.

19. A vinyl acetate and vinyl chloride copolymer in the form of a spherical particle powder, prepared by the process of claim 3, and the further process step of isolating polymer particles formed in the suspension polymerization and drying, the particles soluble in ethyl acetate at 20 weight percent solids to form a clear solution.

20. A vinyl acetate and vinyl chloride copolymer in the form of a spherical particle powder, prepared by the process of claim 5, and the further process step of isolating polymer particles formed in the suspension polymerization and drying, the particles soluble in ethyl acetate at 20 weight percent solids to form a clear solution.

* * * * *